(12) United States Patent
Van Der Walt et al.

(10) Patent No.: US 11,446,587 B2
(45) Date of Patent: Sep. 20, 2022

(54) LIQUID NATURAL GAS PROCESSING

(71) Applicant: NEXT Carbon Solutions, LLC, Houston, TX (US)

(72) Inventors: Ivan Van Der Walt, Conroe, TX (US); Ben Heichelbech, Houston, TX (US); Alex Thompson, Sugar Land, TX (US); Vikrum Subra, Houston, TX (US); Victor Fernandes, Sugar Land, TX (US); Michael Abegg, Anchorage, AK (US)

(73) Assignee: NEXT CARBON SOLUTIONS, LLC, Houston, TX (US)

( * ) Notice: Subject to any disclaimer, the term of this patent is extended or adjusted under 35 U.S.C. 154(b) by 0 days.

(21) Appl. No.: 17/592,809

(22) Filed: Feb. 4, 2022

(65) Prior Publication Data
US 2022/0249974 A1 Aug. 11, 2022

Related U.S. Application Data

(60) Provisional application No. 63/146,434, filed on Feb. 5, 2021.

(51) Int. Cl.
| | | |
|---|---|---|
| *B01D 53/02* | (2006.01) | |
| *B01D 5/00* | (2006.01) | |
| *F02C 7/22* | (2006.01) | |
| *B01D 53/14* | (2006.01) | |
| *B01D 53/26* | (2006.01) | |
(Continued)

(52) U.S. Cl.
CPC ......... *B01D 5/0057* (2013.01); *B01D 53/002* (2013.01); *B01D 53/0438* (2013.01); *B01D 53/1475* (2013.01); *B01D 53/1493* (2013.01); *B01D 53/18* (2013.01); *B01D 53/261* (2013.01); *C10L 3/104* (2013.01); *C10L 3/106* (2013.01); *F02C 1/05* (2013.01); *F02C 7/22* (2013.01); *B01D 2252/204* (2013.01); *B01D 2257/80* (2013.01); *C10L 2290/541* (2013.01); *C10L 2290/542* (2013.01)

(58) Field of Classification Search
CPC ................ B01D 5/0057; B01D 53/002; B01D 53/0438; B01D 53/1475; B01D 53/1493; B01D 53/18; B01D 53/261; B01D 2252/204; B01D 2257/80; C10L 3/104; C10L 3/406; C10L 2290/541; C10L 2290/542; F02C 1/05; F02C 7/22
See application file for complete search history.

(56) References Cited

U.S. PATENT DOCUMENTS

| | | | |
|---|---|---|---|
| 10,315,150 B2* | 6/2019 | Huntington | ............ F25J 3/0266 |
| 10,627,158 B2* | 4/2020 | Repasky | ................ F25J 1/0284 |

(Continued)

*Primary Examiner* — Christopher P Jones
(74) *Attorney, Agent, or Firm* — K&L Gates LLP

(57) ABSTRACT

Devices, systems, and methods for liquefied natural gas production facilities are disclosed herein. A liquefied natural gas (LNG) production facility includes a liquefaction unit and a gas turbine. The liquefaction unit condenses natural gas vapor into liquefied natural gas. The LNG production facility further includes at least one post-combustion capture unit that captures a carbon dioxide ($CO_2$)-rich stream from a flue gas stream of the gas turbine. The LNG production facility also includes a sequestration compression unit that compresses at least one $CO_2$-rich stream from the at least one post-combustion capture unit.

26 Claims, 2 Drawing Sheets

(51) Int. Cl.
*B01D 53/00* (2006.01)
*B01D 53/18* (2006.01)
*B01D 53/04* (2006.01)
*C10L 3/10* (2006.01)
*F02C 1/05* (2006.01)

(56) References Cited

U.S. PATENT DOCUMENTS

| | | | |
|---|---|---|---|
| 2010/0263406 A1* | 10/2010 | Dam | F25J 1/0284 |
| | | | 62/613 |
| 2012/0108117 A1* | 5/2012 | Kwon | H01M 8/0662 |
| | | | 62/48.1 |
| 2015/0376801 A1* | 12/2015 | Bairamijamal | C07C 29/1518 |
| | | | 518/704 |
| 2016/0045841 A1* | 2/2016 | Kaplan | C01B 32/05 |
| | | | 429/49 |
| 2018/0283773 A1* | 10/2018 | Mondkar | F25J 1/0257 |
| 2019/0233296 A1* | 8/2019 | Novek | B01D 61/002 |
| 2020/0317305 A1* | 10/2020 | Kim | B63B 21/50 |

* cited by examiner

LIQUID NATURAL GAS PROCESSING

CROSS REFERENCE TO RELATED APPLICATIONS

The present application claims the benefit of priority to U.S. Provisional Application No. 63/146,434 filed Feb. 5, 2021, the entirety of which is incorporated herein by reference.

BACKGROUND

Energy facilities such as liquefied natural gas facilities and natural gas power plants contribute to greenhouse gases. Greenhouse gases comprise various gaseous compounds, including carbon dioxide, methane, nitrous oxide, hydrofluorocarbons, perfluorocarbons, and sulfur hexafluoride, that absorb radiation, trap heat in the atmosphere, and generally contribute to undesirable environmental greenhouse effects.

Liquefied natural gas often implements certain forms of hydrocarbon emissions conversion technologies, such as thermal oxidizers and flares, to convert hydrocarbon emissions into carbon dioxide. Typically liquefied natural gas facilities do not incorporate greenhouse gas removal technologies. Sources of greenhouse gases in liquefied natural gas facilities typically include gas turbine exhaust(s), thermal oxidizers, various flares, and marine vent systems.

Liquefied natural gas production facilities and related processes for producing liquefied natural gas in a facility, as well as natural gas power plants and related processes for producing natural gas power, need to improve the overall efficiency of the facility and reduce greenhouse gas emissions.

SUMMARY

In light of the disclosure herein, and without limiting the scope of the invention in any way, in a first aspect of the present disclosure, which may be combined with any other aspect listed herein unless specified otherwise, a liquefied natural gas (LNG) production facility includes a liquefaction unit and a gas turbine. The liquefaction unit condenses natural gas vapor into liquefied natural gas.

In a second aspect of the present disclosure, which may be combined with any other aspect listed herein unless specified otherwise, the LNG facility further includes at least one post-combustion capture unit that generates a carbon dioxide (CO2)-rich stream from the gas turbine.

In a third aspect of the present disclosure, which may be combined with any other aspect listed herein unless specified otherwise, the LNG facility further includes a sequestration compression unit configured to compress and convey at least one CO2-rich stream from a post-combustion capture unit, towards a sequestration site, thereby reducing the overall emissions from the LNG facility.

In a fourth aspect of the present disclosure, which may be combined with any other aspect listed herein unless specified otherwise, the sequestration site comprises an underground geological formation comprising an at least partially depleted hydrocarbon reservoir.

In a fifth aspect of the present disclosure, which may be combined with any other aspect listed herein unless specified otherwise, the sequestration site comprises a region on top of a seabed, said region located at a depth greater than about 3.0 kilometers below sea level.

In an sixth aspect of the present disclosure, which may be combined with any other aspect listed herein unless specified otherwise, the sequestration site comprises a region below a seabed.

In a seventh aspect of present disclosure, which may be combined with any other aspect listed herein unless specified otherwise, the CO2-rich stream is sent to an industrial facility.

In an eighth aspect of the present disclosure, which may be combined with any other aspect listed herein unless specified otherwise, the LNG facility further includes an acid gas removal unit configured to accept raw feed natural gas and to generate an acid gas stream, a flash gas stream, and a purified natural gas stream. The acid gas stream is directable to the sequestration compression unit.

In a ninth aspect of the present disclosure, which may be combined with any other aspect listed herein unless specified otherwise, the flash gas stream is directable to the sequestration compression unit.

In a tenth aspect of the present disclosure, which may be combined with any other aspect listed herein unless specified otherwise, the post-combustion capture unit includes an amine absorber and liquid amine absorbent for absorbing CO2. Heat from a waste heat recovery unit is directable to the post-combustion capture unit to provide heat for regenerating the liquid amine absorbent.

In a eleventh aspect of the present disclosure, which may be combined with any other aspect listed herein unless specified otherwise, the post-combustion capture unit includes an absorber and liquid ammonia absorbent for absorbing CO2. Heat from a waste heat recovery unit is directable to the post-combustion capture unit to provide heat for regenerating the liquid ammonia absorbent.

In a twelfth aspect of the present disclosure, which may be combined with any other aspect listed herein unless specified otherwise, the post-combustion capture unit includes a carbonate absorber and liquid carbonate absorbent (e.g. Potassium Carbonate Solution) for absorbing CO2. Heat from a waste heat recovery unit is directable to the post-combustion capture unit to provide heat for regenerating the liquid carbonate absorbent In a thirteenth aspect of the present disclosure, which may be combined with any other aspect listed herein unless specified otherwise, the LNG facility further includes a dehydration unit including a solid adsorbent, the dehydration unit configured to receive the purified natural gas stream from the acid gas removal unit and to provide a dry purified natural gas stream.

In a fourteenth aspect of the present disclosure, which may be combined with any other aspect listed herein unless specified otherwise, the sequestration compression unit comprises a compressor driven by an electric motor.

In a fifteenth aspect of the present disclosure, which may be combined with any other aspect listed herein unless specified otherwise, the sequestration compression unit comprises a compressor driven by the gas turbine.

In a sixteenth aspect of the present disclosure, which may be combined with any other aspect listed herein unless specified otherwise, LNG facility further includes a cogeneration unit configured to receive heat from the waste heat recovery unit and to provide power to a power generator.

In a seventeenth aspect of the present disclosure, which may be combined with any other aspect listed herein unless specified otherwise, the LNG facility further includes at least one booster fan configured to receive a flue gas stream from the gas turbine and to convey the flue gas stream towards the post-combustion capture unit.

In a eighteenth aspect of the present disclosure, which may be combined with any other aspect listed herein unless specified otherwise, a liquefied natural gas (LNG) production facility includes a liquefaction unit that condenses natural gas vapor into liquefied natural gas; a gas turbine; at least one post-combustion capture unit configured to capture a CO2-rich stream from a flue gas of the gas turbine; and a sequestration compression unit configured to compress and convey at least one CO2-rich stream from the at least one post-combustion capture unit, towards a sequestration site.

In a nineteenth aspect of the present disclosure, which may be combined with any other aspect listed herein unless specified otherwise, a liquefied natural gas (LNG) production facility includes a liquefaction unit that condenses natural gas vapor into liquefied natural gas; a gas turbine configured to combust a hydrocarbon fuel; at least one post-combustion capture unit that captures a CO2-rich stream from the flue gas of the gas turbine; and a sequestration compression unit configured to compress the CO2-rich stream from the at least one post-combustion capture unit and to transport the CO2-rich stream towards an off-site sequestration reservoir, reducing the overall emissions from the LNG production facility.

In a twentieth aspect of the present disclosure, which may be combined with any other aspect listed herein unless specified otherwise, a liquefied natural gas (LNG) production facility includes a liquefaction unit that condenses natural gas vapor into liquefied natural gas; a gas turbine; at least one post-combustion capture unit configured to generate a CO2-rich stream from the flue gas of the gas turbine; and a sequestration compression unit configured to transport at least one CO2-rich stream from the at least one post-combustion capture unit towards a sequestration site; and a marine vent system adapted to receive marine vessel tank gas from a marine LNG storage tank of a marine vessel and to direct the marine vessel tank gas to feed any of the at least one post-combustion capture unit, the sequestration compression unit, and a fuel gas conditioning unit configured to provide fuel for the gas turbine. The marine vessel tank gas is an inert gas used for purging the marine vessel tank after a maintenance event on the marine vessel.

In a twenty-first aspect of the present disclosure, which may be combined with any other aspect listed herein unless specified otherwise, a process of producing liquefied natural gas (LNG) in an LNG production facility comprising a liquefaction unit, a gas turbine, at least one post-combustion capture unit, and a sequestration compression unit, the process includes condensing, by the liquefaction unit, natural gas vapor into liquefied natural gas; combusting, by the gas turbine, a hydrocarbon fuel; capturing, by the at least one post-combustion capture unit, a CO2-rich stream from the flue gas of the gas turbine; and compressing and conveying, by the sequestration compression unit, at least one CO2-rich stream from the at least one post-combustion capture unit, towards a sequestration site.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been principally selected for readability and instructional purposes, and not to limit the scope of the inventive subject matter.

BRIEF DESCRIPTION OF THE FIGURES

Understanding that the figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION OF EXAMPLE EMBODIMENTS

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One of ordinary skill in the art could implement numerous alternate embodiments, which would still fall within the scope of the claims. Unless a term is expressly defined herein using the sentence "As used herein, the term '__' is hereby defined to mean . . . " or a similar sentence, there is no intent to limit the meaning of that term beyond its plain or ordinary meaning. To the extent that any term is referred to in this patent in a manner consistent with a single meaning, that is done for sake of clarity only, and it is not intended that such claim term be limited to that single meaning. Finally, unless a claim element is defined by reciting the word "means" and a function without the recital of any structure, it is not intended that the scope of any claim element be interpreted based on the application of 35 U.S.C. § 112(f).

Figure 1A:
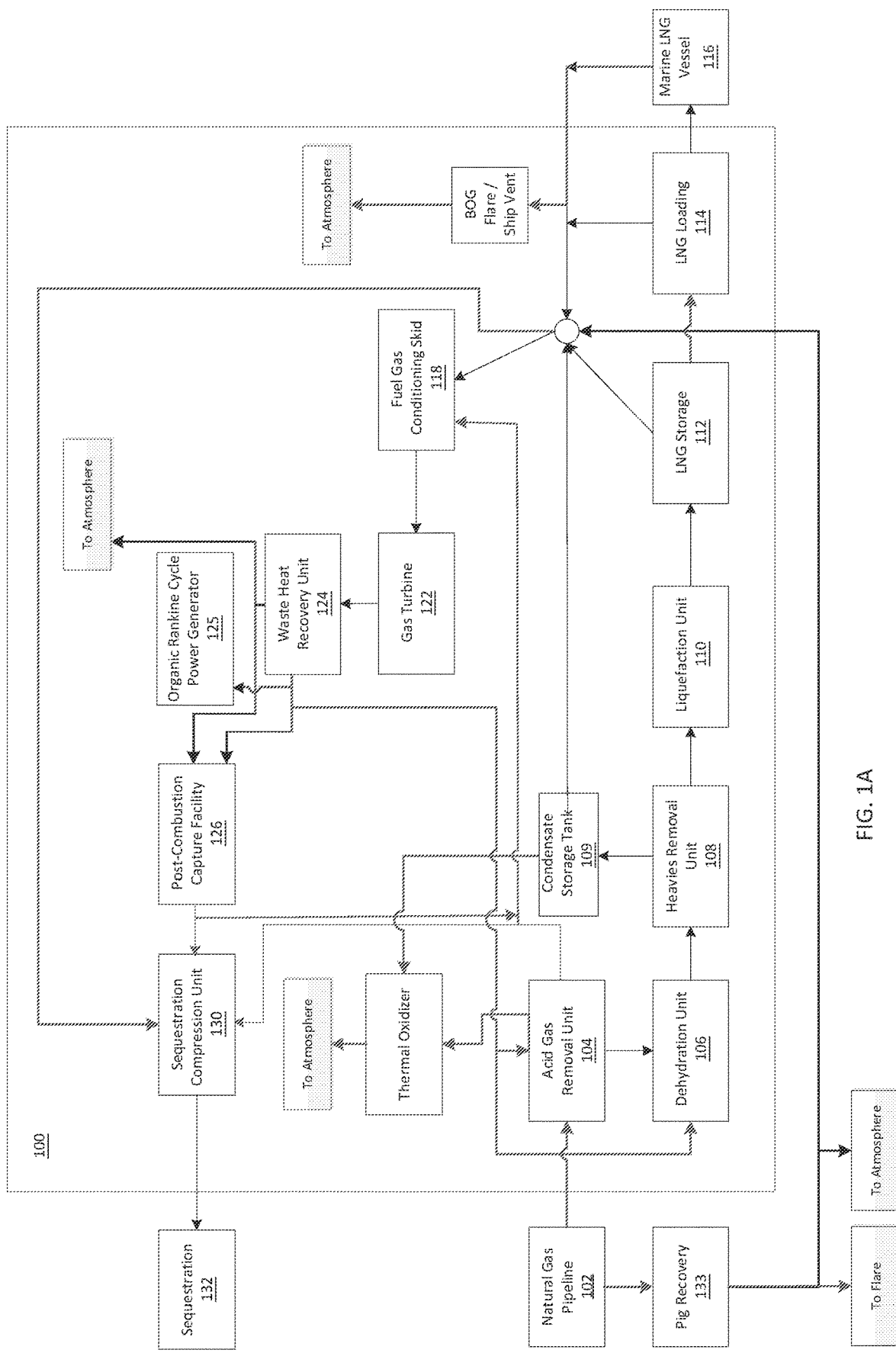
FIG. 1A and FIG. 1B illustrate exemplary schematics of a liquefied natural gas production facility with carbon capture.
Figure 1B:
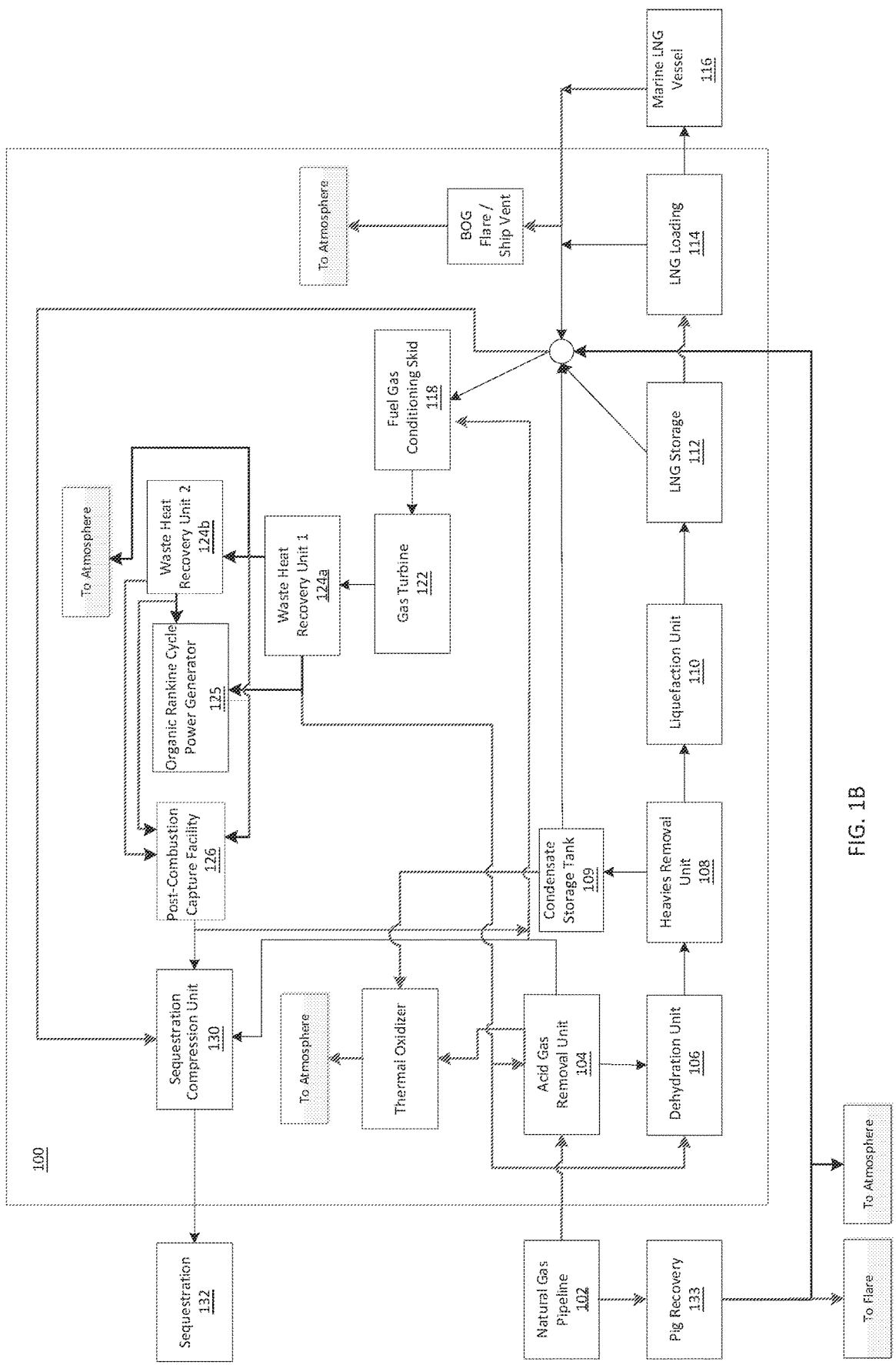

Referring now to the figures, FIG. 1A and FIG. 1B illustrate exemplary schematics of a liquefied natural gas production facility 100. Beginning with FIG. 1A, the facility 100 receives raw feed gas, such as natural gas, from a pipeline 102 (e.g., a natural gas pipeline).

Once received, the natural gas is sent from the pipeline 102 to an acid gas removal unit 104 within the facility 100. The acid gas removal unit 104 accepts this natural gas from pipeline 102 and generates one or more of an acid gas stream, a flash gas stream, and a purified natural gas stream. The acid gas stream may typically comprise mostly CO2 and H2O. Generally, the acid gas stream may contain at least about 85% by volume of CO2, with the remainder comprising primarily water in vapor form. The acid stream may generally comprise between about 1% to about 5%, by volume, of the incoming untreated natural gas stream. The flash gas stream may typically comprise mostly methane and CO2. The flash gas stream may generally comprise less than about 0.5% by volume of the incoming untreated natural gas stream. The purified natural gas stream may contain mainly methane, water and other, heavier hydrocarbons.

Upon processing by the acid gas removal unit 104, the purified natural gas stream, with the carbon dioxide removed, is sent to a dehydration unit 106.

More specifically, the treated gas is sent to the dehydration unit 106, which removes water from the gas. As illustrated by FIG. 1A and FIG. 1B, the dehydration unit 106 is located downstream of the acid gas removal unit 104. Thus, because the amine solution of the acid gas removal unit 104 saturates the exiting feed gas with water, this water is removed in the dehydration unit 106. In an embodiment, the dehydration unit 106 can reduce water content of feed gas to less than 0.5 ppmv, to prevent water from freezing out in the downstream cryogenic processing within the facility 100. The dehydration unit 106 may include a solid adsorbent.

The gas, as a dry purified natural gas stream, is then sent to a heavies removal unit 108. In an embodiment, the heavies removal unit 108 is configured to receive the dry purified natural gas stream from the dehydration unit 106 and subsequently produce both a liquid condensate product and a vapor product. The liquid condensate may typically comprise at least about 99.5% by weight C5+ components. The vapor product may typically comprise at least about 97% by volume methane. Specifically, the heavies removal unit 108 separates condensate from gas and sends the condensate to a condensate storage tank 109. Generally, a purpose of the heavies removal unit 106 is to remove enough C5 and heavier components (including benzene) from the dry natural gas stream that has left the dehydration unit 106 so that the vapor product from the heavies removal unit 108 (once condensed) will meet the liquid natural gas (LNG) product specification(s), such as a required heating value specification. Generally, another purpose of the heavies removal unit 106 is remove enough C5 and heavier components in order avoid the undesirable freezing of these components during liquefaction. In an embodiment, the heavies removal unit 108 includes a series of pumps, exchangers, towers, compressors, and other related processing equipment for separating heavy components.

The heavy components (e.g., a liquid condensate product) are sent to a condensate storage tank 109. Some of this condensate will boil off, producing condensate boil off gas (BOG). This boil off gas may typically comprise mainly C5 and C6 hydrocarbons. In a traditional liquefied natural gas production facility, the boil off gas from the condensate storage tank may be sent to a thermal oxidizer to be combusted and then released to the atmosphere.

After processing at the heavies removal unit 108, the dry purified natural gas stream with at least 95% of the C5+ components is sent to a liquefaction unit 110. In an embodiment, the liquefaction unit 110 includes one or more refrigeration units, compressors, and/or heat exchangers, which convert the gas into LNG via cooling and condensation. For example, the temperature of the gas may be lowered to approximately −260° F., thus necessitating a phase change from gas to LNG. In an embodiment, the main refrigeration compressor(s) for liquefaction unit 110 may be driven by a natural gas fired turbine. For example, liquefaction unit 110 may be powered, at least in part, via gas turbine 122. In an embodiment, gas turbine 122 is mechanically coupled to at least one compressor within liquefaction unit 110. In an alternative embodiment, liquefaction unit 110 comprises at least one electrically-driven compressor, and gas turbine 122 drives an electric generator to provide electric power to electrical users within the facility.

The LNG is then sent to LNG storage 112. In an embodiment, LNG storage 112 is one or more storage tanks, such as double walled tanks, which may be transportable. Once in a stored-state, the LNG is constantly boiling off, producing additional boil off gas, which may be sent to the fuel gas conditioning skid 118 as disclosed in greater detail herein. Additionally or alternatively, boil off gas can be recompressed and sent back to the liquefaction unit 110.

Via LNG loading infrastructure 114, the LNG is pumped out of the LNG storage tanks 112 and loaded into marine LNG vessels 116, via loading arms, cranes, forklifts, and/or other transportation means. In a particular embodiment, the marine LNG vessel 116 is a seafaring ship with marine LNG storage tanks. Loading LNG onto a marine LNG vessel 116 typically produces additional boil off gas, which may be sent to fuel gas conditioning skid 118, or alternatively, may be recompressed and sent back to the liquefaction unit 110. Advantageously, the boil off gas is not sent to a thermal oxidizer or other flare such as a marine flare. The facility 100 may further include a marine vent system, adapted to receive gas from a marine LNG storage tank on the marine LNG vessel 116, and subsequently direct this vessel gas (e.g., boil off gas from LNG, carbon monoxide, carbon dioxide, nitrogen, or mixtures thereof) to any of fuel gas conditioning skid 118, post-combustion capture facility 126, and sequestration compression 130, as appropriate, or alternatively, may be recompressed and sent back to the liquefaction unit 110. Traditionally, the boil off gas from the LNG storage tanks 112, loading infrastructure 114 and marine LNG vessels 116, may be sent to flare and/or to a vessel vent system and released to the atmosphere.

The boil off gas from one or more of the condensate storage tank 109, the LNG storage 112, the LNG loading 114, and the marine LNG vessel 116 can be sent to a fuel gas conditioning skid 118.

The fuel gas conditioning skid 118 takes streams of natural gas, such as boil off gases, and adjusts various physical conditions (e.g., temperatures, pressures, blends, and the like) to ensure that the gases are configured for optimal combustion in a gas turbine 122. An exemplary fuel gas may comprise at least about 90% methane by volume method. In an embodiment, the fuel gas contains no more than about 35% inert gas by volume. In an embodiment, the fuel gas conditioning skid 118 directs fuel gas to the gas turbine 122. The flash gas stream from acid gas removal unit 104 is directable to the fuel gas conditioning skid 118 for use as fuel for the gas turbine 122.

In an embodiment, the facility 100 includes one or more electric generators, whereby the gas turbine 122 is coupled to the one or more electric generators; in this embodiment, the facility 100 may further serve as a natural gas fired power generation facility.

Once combusted, flue gas from the gas turbine 122 may pass to one or more waste heat recovery units, prior to being received into a post-combustion capture unit 126. In an exemplary embodiment, the gas from the gas turbine 122 contains between about 1.5% and about 5% by volume CO2. For example, as seen in FIG. 1A, the flue gas from the gas turbine 122 may pass to waste heat recovery unit 124, which uses heat generated by the combustion in the gas turbine 122 to heat up a heat medium (e.g., hot oil or steam). The heated medium is then used in various processes throughout the facility 100 where additional heat is required (e.g., amine regeneration, dehydration regeneration, and the like).

For example, the waste heat recovery unit 124 may advantageously communicate with one or more of the acid gas removal unit 104, the dehydration unit 106, and a post-combustion capture facility 126 in order to provide heat to these components. In an embodiment, the waste heat recovery unit 124 communicates with a cogeneration unit (not illustrated), which uses the waste heat of the flue gas from gas turbine 122 to generate steam that, in turn, rotates a generator to produce electricity. In another embodiment, the waste heat recovery unit 124 communicates with an organic rankine cycle power generator 125 to produce additional power. The electricity can then be used in other parts of the facility 100 or, alternatively, be sent to the electric grid. The waste heat recovery unit 124 may provide heat to the organic rankine cycle power generator 125. In other embodiments, the waste heat recovery unit 124 directs flue gas directly to the post-combustion capture facility 126.

After heat has been recovered at the waste heat recovery unit 124, flue gas passes to a post-combustion capture facility 126. Advantageously, the gas does not need to be released into the atmosphere as in some traditional facilities. In certain embodiments, the gas may bypass the post-combustion capture facility 126 and be vented to the atmosphere in the event that the post-combustion capture facility 126 and/or the sequestration compression unit 130 may not be in operation due to maintenance and/or unplanned shutdown.

In an embodiment, similar to the capture units discussed previously, the post-combustion capture facility 126 generates a carbon dioxide rich stream from the flue gas derived from the gas turbine 122. In an embodiment, the carbon dioxide stream may be about 85% to about 95% by volume $CO_2$, and about 5% to about 15% by volume $H_2O$. Specifically, the post-combustion capture facility 126 captures the $CO_2$ from the flue gas, for example, using a solvent process to absorb carbon dioxide from the flue gas stream. Specifically, it should be appreciated that there are different types of solvents (amine, ammonia, carbonate based, chilled ammonia, etc.) depending on the specific process chosen for the post-combustion capture facility 126. As noted above, natural gas fired turbines typically may produce a relatively less concentrated carbon dioxide stream (e.g., containing between about 1.5% and about 5% by volume $CO_2$).

In certain embodiments, one or more booster fans (not shown) are configured to receive a flue gas stream from the gas turbine 122 and to convey the flue gas stream towards the post-combustion capture facility 126. Such one or more booster fans may advantageously be located downstream of any waste heat recover unit(s). In an embodiment, the post-combustion capture facility 126 includes an amine absorber and liquid amine absorbent for absorbing carbon dioxide. After post-combustion capture, a $CO_2$-rich stream passes to the sequestration compression unit 130.

The sequestration compression unit 130 includes one or more knockout drums for collecting any remaining liquid in the $CO_2$-rich stream. The sequestration compression unit 130 further includes at least one compressor, configured to compress the $CO_2$ rich stream, and a dehydration system for removing residual water from the $CO_2$ rich stream, for example, which may be then sent to a pipeline for off-site sequestration 132. In an embodiment, this $CO_2$ rich stream may be compressed to at least about 100 Bar, and have a temperature less than about 125° C., and it may comprise a supercritical fluid consisting of at least about 99% by volume $CO_2$. In an embodiment, the sequestration compression unit 130 includes a compressor that is driven by a gas turbine. In yet another embodiment, the sequestration compression unit 130 includes a compressor that is driven by an electric motor. In a further embodiment the sequestration compression unit 130 includes a compressor that is driven by steam provided by the waste heat recovery unit 124.

By sending the $CO_2$-rich stream to some form of sequestration, overall greenhouse gas emissions from the facility 100 are reduced by at least about 85%, and more preferably, at least about 90%, relative to an LNG production facility operating without a post-combustion capture unit and sequestration compression unit. In an embodiment, at least about 85% of the $CO_2$ present in the flue gas of the gas turbine are captured and sequestered.

Various forms of sequestration (not shown in FIG. 1A) may be implemented, including, for example, sending the $CO_2$-rich gas to an on-site or off-site storage tank, to a tank mounted on a rail car, to a tank mounted on a truck-drawn trailer and/or to another industrial facility to use the $CO_2$ in an industrial process (e.g. synthetic fuel production). After compression, the sequestered $CO_2$ rich gas may advantageously be sold for a number of well-known applications and uses.

As previously noted, the sequestration compression unit 130 sends the carbon dioxide-rich stream away from the facility 100 for off-site sequestration 132. In an embodiment, sequestration 132 is an underground geological formation that includes at least a partially depleted hydrocarbon reservoir. In a related embodiment, at least some of the transferred carbon dioxide rich stream is injectable into the hydrocarbon reservoir, to aid in enhanced oil recovery. In another example, the sequestration site is a region on top of a seabed, at a depth greater than three kilometers below sea level. In yet another example, the sequestration site is a region below a seabed, or other dispositions as disclosed herein.

The natural gas pipeline 102 providing natural gas to the LNG facility 100 may have associated with it one or more pig recovery systems 133 or other pig-related systems, which may be significant sources of emissions that would typically be flared and/or vented to the atmosphere. In an embodiment, emissions from the pig recovery system 133 are directed to the fuel conditioning skid 118, or alternatively, to sequestration compression 130.

FIG. 1B illustrates an exemplary schematic of liquefied natural gas production facility 100, that is similar to that of FIG. 1A. However, the facility 100 of FIG. 1B features a first waste heat recovery unit 124a and a waste second heat recovery unit 124b. The first waste heat recovery unit 124a receives and recovers heat from flue gas from the gas turbine 122, using a heat transfer medium such as hot oil or steam. This heated medium may then be used in various processes throughout the facility 100 where additional heat is required (e.g., amine regeneration, dehydration regeneration, and the like). In an embodiment, first waste heat recovery unit 124a may advantageously communicate with one or more of the acid gas removal unit 104, the dehydration unit 106, in order to provide heat to these components.

Second waste heat recovery unit 124b receives and recovers heat from combustion gas (originally formed in gas turbine 122) passed from first waste heat recovery unit 124a, again using a suitable heat transfer medium such as hot oil or steam. This heated medium may then be used in various processes throughout the facility 100 where additional heat is required. In an embodiment, the second waste heat recovery unit 124b may advantageously communicate with post-combustion capture unit 126, in order to provide heat to these components. Combustion gas then passes from second heat recovery unit 124b to post-combustion capture unit 126 for $CO_2$ removal and capture.

The use of two waste heat recovery units provides several advantages relative to the use of a single waste heat unit. For example, in embodiments in which the heat transfer medium is hot oil is contained in closed loops (i.e., closed circuits between the respective waste heat recovery unit and the component units to which heat is transferred), the use of two waste heat recovery units allows for two separate closed loops, each operating at a different temperature. For example, first waste heat recovery unit 124a may provide a heat transfer medium such as hot oil at an operating temperature range of about 600° F. to about 900° F., while second waste heat recovery unit 124b provides a heat transfer medium such as hot oil at an operating temperature range of about 400° F. to about 700° F. Such dual systems are easier to control and to tailor to the specific heating requirements of the components to receive heat. Moreover, in the event that the post-combustion capture facility and/or the sequestration compression unit may not be in operation, the combustion gases may still be passed through the first waste heat recovery unit 124a, and then vented to the atmosphere (i.e., bypassing the second waste heat recovery unit 124b). In such case, the continued operation of the first waste heat recovery unit 124a allows LNG production facility 100 to operate more efficiently, as the first waste heat recovery unit 124a still provides heat for use by acid gas removal unit 104 and dehydration unit 106.

As with FIG. 1A, the waste heat recovery unit 124b may communicate with an organic rankine cycle power generator 125 to produce additional power. The electricity can then be used in other parts of the facility 100 or, alternatively, be sent to the electric grid. The waste heat recovery units 124a, 124b may provide heat to the organic rankine cycle power generator 125. In other embodiments, the flue gas is directed from the waste heat recovery units 124a, 124b directly to the post-combustion capture facility 126.

As used in this specification, including the claims, the term "and/or" is a conjunction that is either inclusive or exclusive. Accordingly, the term "and/or" either signifies the presence of two or more things in a group or signifies that one selection may be made from a group of alternatives.

The many features and advantages of the present disclosure are apparent from the written description, and thus, the appended claims are intended to cover all such features and advantages of the disclosure. Further, since numerous modifications and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable now or in the future.

The invention is claimed as follows:

1. A liquefied natural gas (LNG) production facility comprising:
    an acid gas removal unit configured to receive a raw feed natural gas and generate a purified natural gas stream and at least one of an acid gas stream or a flash gas stream;
    a gas turbine configured to combust a fuel gas;
    a fuel gas conditioning unit configured to receive, condition, and direct a boil off gas to the gas turbine to be used as the fuel gas;
    at least one waste heat recovery unit configured to recover heat from a flue gas stream of the gas turbine and provide the heat to at least one of the acid gas removal unit, a dehydration unit, or a post-combustion capture unit;
    a heating medium heated from the at least one waste heat recovery unit to provide heat to at least one of the acid gas removal unit, the dehydration unit, or the post-combustion capture unit;
    the post-combustion capture unit configured to capture the flue gas stream of the gas turbine; and
    a sequestration compression unit configured to compress and convey a carbon dioxide (CO2)-rich stream towards a sequestration site,
    wherein the CO2-rich stream is selected from the group consisting of a CO2-rich product stream of the post-combustion capture unit and the at least one of the acid gas stream or the flash gas stream, and mixtures thereof.

2. The LNG production facility of claim 1, wherein the acid gas removal unit is configured to generate the flash gas stream, and the fuel gas conditioning unit is configured to further receive and direct the flash gas stream to the gas turbine to be used as the fuel gas.

3. The LNG production facility of claim 1, wherein the acid gas removal unit is configured to generate the acid gas stream, the acid gas stream comprising at least about 80% by volume of CO2.

4. The LNG production facility of claim 1, wherein the gas turbine is mechanically coupled to a compressor within a liquefaction unit and is configured to at least partially power the liquefaction unit.

5. The LNG production facility of claim 4, wherein the compressor is an electrically-driven compressor, and the gas turbine is configured to drive an electric generator to provide electric power to electrical users within the facility.

6. The LNG production facility of claim 1, wherein at least one of the post-combustion capture unit or the acid gas removal unit includes at least one of an amine absorber or a liquid amine absorbent for absorbing CO2.

7. The LNG production facility of claim 1, wherein the fuel gas contains no more than about 35% inert gas by volume.

8. The LNG production facility of claim 1, wherein the at least one waste heat recovery unit comprises a first waste heat recovery unit and a second waste heat recovery unit.

9. The LNG production facility of claim 8, wherein the first waste heat recovery unit is configured to pass the flue gas stream of the gas turbine to the second waste heat recovery unit.

10. The LNG production facility of claim 8, wherein the first waste heat recovery unit comprises a first heat transfer medium and is configured to operate at a first operating temperature range; and the second waste heat recovery unit comprises a second heat transfer medium and is configured to operate at a second operating temperature range.

11. The LNG production facility of claim 10, wherein the first heat transfer medium is different from the second heat transfer medium, and the operating temperature range of the first heat transfer medium is different from the operating temperature range of the second heat transfer medium.

12. The process of claim 1, wherein waste heat from the at least one waste heat recovery unit is utilized to provide heat to an organic rankine cycle generator to further cool the flue gas and generate electricity.

13. The LNG production facility of claim 1, wherein the compressed CO2-rich stream comprises a supercritical fluid comprising at least about 99% by volume CO2.

14. The LNG production facility of claim 1, wherein the heating medium comprises one of steam or a hot oil.

15. A process of producing liquefied natural gas (LNG) in an LNG production facility comprising an acid gas removal unit, a dehydration unit including a solid adsorbent, a heavies removal unit, a condensation storage tank, a liquefaction unit, an LNG storage tank, an LNG loading facility, a gas turbine, a fuel gas conditioning unit, at least one waste heat recovery unit, a post-combustion capture unit, and a sequestration compression unit, the process comprising:
    receiving, by the acid gas removal unit, a raw feed natural gas and generating, by the acid gas removal unit, a purified natural gas stream and at least one of an acid gas stream or a flash gas stream;

receiving, by the dehydration unit, the purified natural gas stream from the acid gas removal unit and providing a dry purified natural gas stream;

receiving, by the heavies removal unit, the dry purified natural gas stream from the dehydration unit and producing a liquid condensate product and a vapor product;

receiving, by the condensation storage tank, the liquid condensate product from the heavies removal unit and allowing for venting of a boil off gas;

condensing, by the liquefaction unit, the vapor product from the heavies removal unit into the LNG;

combusting, by the gas turbine, a fuel gas;

recovering, by the at least one waste heat recovery unit, heat from a flue gas stream of the gas turbine and providing the heat to at least one of the acid gas removal unit, the dehydration unit, or the post-combustion capture unit;

capturing, by the post-combustion capture unit, the flue gas stream of the gas turbine; and compressing and conveying, by the sequestration compression unit, a carbon dioxide ($CO_2$)-rich stream towards a sequestration site, wherein the $CO_2$-rich stream is selected from the group consisting of a $CO_2$-rich product stream of the post-combustion capture unit and the at least one of the acid gas stream or the flash gas stream, and mixtures thereof.

16. The process of claim 15 comprising:

generating, by the acid gas removal unit, the flash gas stream; and receiving and directing, by the fuel gas conditioning unit, the flash gas stream to the gas turbine to be used as the fuel gas.

17. The process of claim 15 comprising generating, by the acid gas removal unit, the acid gas stream, the acid gas stream comprising at least about 80% by volume of $CO_2$.

18. The process of claim 15, wherein the gas turbine is mechanically coupled to a compressor within the liquefaction unit, the process comprising at least partially powering the liquefaction unit by the gas turbine.

19. The process of claim 18, wherein the compressor comprises a gas turbine-driven compressor, the process comprising driving an electric generator to provide electric power to electrical users within the facility.

20. The process of claim 15, wherein at least one of the post-combustion capture unit or the acid gas removal unit includes at least one of an amine absorber or a liquid amine absorbent for absorbing $CO_2$, the process comprising absorbing $CO_2$ by at least one of the post-combustion capture unit or the acid gas removal unit.

21. The process of claim 15, wherein the fuel gas contains no more than about 35% inert gas by volume.

22. The process of claim 15, wherein the at least one waste heat recovery unit comprises a first waste heat recovery unit and a second waste heat recovery unit.

23. The process of claim 22, wherein the first waste heat recovery unit comprises a first heat transfer medium, wherein the second waste heat recovery unit comprises a second heat transfer medium, and the process comprising operating the first waste heat recovery unit at a first temperature and operating the second waste heat recovery unit at a second temperature.

24. The process of claim 23, wherein the first heat transfer medium is different from the second heat transfer medium, and the first operating temperature is different from the second operating temperature.

25. The process of claim 22, wherein waste heat from the at least one waste heat recovery unit is utilized to provide heat to an organic rankine cycle generator to further cool the flue gas and generate electricity.

26. The process of claim 15, wherein the compressed $CO_2$-rich stream comprises a supercritical fluid comprising at least about 99% by volume $CO_2$.

* * * * *